United States Patent
Su et al.

(10) Patent No.: US 11,846,160 B2
(45) Date of Patent: Dec. 19, 2023

(54) MULTILAYER SOLID LUBRICANT ARCHITECTURE FOR USE IN DRILLING TOOL APPLICATIONS

(71) Applicant: National Technology & Engineering Solutions of Sandia, LLC, Albuquerque, NM (US)

(72) Inventors: Jiann-Cherng Su, Albuquerque, NM (US); Somuri V. Prasad, Albuquerque, NM (US); Rand Garfield, Corrales, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 152 days.

(21) Appl. No.: 17/485,749

(22) Filed: Sep. 27, 2021

(65) Prior Publication Data
US 2022/0010623 A1 Jan. 13, 2022

Related U.S. Application Data

(62) Division of application No. 16/136,546, filed on Sep. 20, 2018, now Pat. No. 11,156,033.

(51) Int. Cl.
| E21B 4/00 | (2006.01) |
| E21B 4/14 | (2006.01) |
| E21B 17/10 | (2006.01) |
| B32B 9/00 | (2006.01) |
| B32B 15/18 | (2006.01) |

(52) U.S. Cl.
CPC .............. *E21B 4/003* (2013.01); *B32B 9/007* (2013.01); *B32B 15/18* (2013.01); *E21B 4/14* (2013.01); *E21B 17/1007* (2013.01); *B32B 2311/18* (2013.01); *B32B 2313/04* (2013.01); *B32B 2315/02* (2013.01)

(58) Field of Classification Search
CPC . E21B 4/003; E21B 4/14; B32B 9/007; B32B 15/18; B21B 17/1007
See application file for complete search history.

(56) References Cited

U.S. PATENT DOCUMENTS

| 8,220,563 B2 | 7/2012 | Bangaru et al. |
| 2005/0133277 A1 | 6/2005 | Dixon |
| 2007/0205001 A1 | 9/2007 | Shuster et al. |
| 2007/0284255 A1 | 12/2007 | Gorokhovsky et al. |
| 2008/0220257 A1* | 9/2008 | Dekempeneer ....... C23C 28/343 428/408 |
| 2008/0228257 A1 | 9/2008 | Richter |
| 2010/0011826 A1 | 1/2010 | Buehler et al. |
| 2010/0044110 A1* | 2/2010 | Bangru ............... E21B 17/1085 175/320 |
| 2010/0183869 A1 | 7/2010 | Lin et al. |
| 2010/0183884 A1 | 7/2010 | Schier |

(Continued)

*Primary Examiner* — Nathaniel C Chukwurah
(74) *Attorney, Agent, or Firm* — Daniel J. Jenkins

(57) ABSTRACT

A coating architecture is disclosed that includes a substrate having a surface finish $R_a$ of 0.3μ or finer, an intermediate layer overlying and in contact with the substrate; and a solid lubricant layer overlying and in contact with the intermediate layer. The test results of applying the coating architecture to a reciprocating hammer drill utilizing the coating is also disclosed.

7 Claims, 9 Drawing Sheets

(56) References Cited

U.S. PATENT DOCUMENTS

| | | | |
|---|---|---|---|
| 2011/0094628 A1* | 4/2011 | Mitsuda | C23C 14/027 |
| | | | 148/222 |
| 2011/0142384 A1 | 6/2011 | Hofmann | |
| 2011/0177358 A1* | 7/2011 | Horton | C23C 4/08 |
| | | | 427/454 |
| 2011/0203791 A1* | 8/2011 | Jin | E21B 17/042 |
| | | | 166/244.1 |
| 2011/0220415 A1* | 9/2011 | Jin | C23C 14/024 |
| | | | 175/320 |
| 2012/0009403 A1* | 1/2012 | Koike | C23C 28/046 |
| | | | 428/336 |
| 2012/0315082 A1 | 12/2012 | Linzell | |
| 2014/0302305 A1 | 10/2014 | Mukherjee et al. | |
| 2015/0129308 A1 | 5/2015 | Harrington et al. | |
| 2015/0132539 A1 | 5/2015 | Bailey et al. | |
| 2016/0245407 A1 | 8/2016 | Honda et al. | |
| 2017/0029959 A1 | 2/2017 | Lu et al. | |

\* cited by examiner

NEW
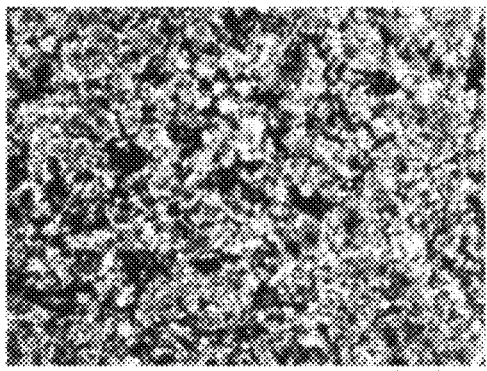
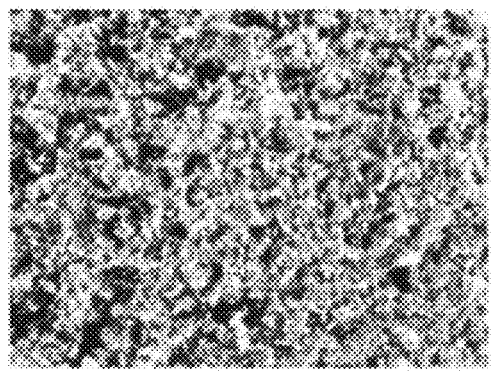
FIG. 11
NEW
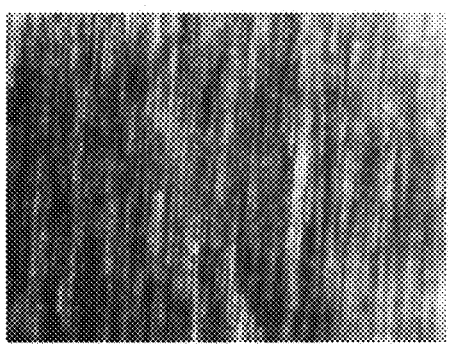
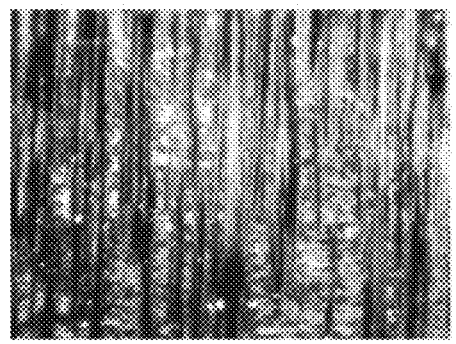
FIG. 10
NEW

MULTILAYER SOLID LUBRICANT ARCHITECTURE FOR USE IN DRILLING TOOL APPLICATIONS

CROSS-REFERENCE TO RELATED APPLICATION

This application is a divisional of U.S. Non-Provisional patent application Ser. No. 16/136,546, filed on Sep. 20, 2018, entitled "MULTILAYER SOLID LUBRICANT ARCHITECTURE FOR USE IN DRILLING TOOL APPLICATIONS", the entirety of which is incorporated herein by reference.

STATEMENT CONCERNING FEDERALLY SPONSORED RESEARCH

This invention was developed under Contract DE-AC04-94AL85000 between Sandia Corporation and the United States Department of Energy and was developed under Contract No. DE-NA0003525 awarded by the United States Department of Energy/National Nuclear Security Administration. The Government has certain rights in this invention.

FIELD OF THE INVENTION

The present invention relates to the field of hammer drilling, and specifically to the field of solid lubricants applied to hammer drills to replace conventional fluid lubricants.

BACKGROUND OF THE INVENTION

Down-the-hole (DTH) hammer drills are used extensively in the mining, construction, and waterwell drilling industries and are arguably the best performing drilling technology used in hard rock drilling. Established research has shown that percussive devices have among the lowest mechanical specific energies (energy required to remove a given volume of rock) of drilling methods and an industry reputation for reliably drilling hard rock. Commercially operated DTH hammer drills are lubricated using grease, oil and molybdenum disulfide. However, in certain circumstances, these lubricants may not be a viable option, especially in high temperature environments. Alternatively, the area in which the drilling is required may be an environmentally sensitive area, and the prior art lubricants may not be suitable for those locations.

What is needed is a lubricant that can be used on a reciprocating drill to extend the drill life when used in high-temperature oxidizing environments so as to survive high temperatures of use without adversely affecting environments.

BRIEF DESCRIPTION OF THE INVENTION

A reciprocating hammer drill comprises an outer casing, an air distribution device (feed tube) positioned within the casing, and a piston positioned with the casing and over the feed tube. The feed tube provides compressed air to an interior of the casing that drives reciprocation of the piston. The piston enclosed within the casing has an exterior surface opposed to the casing and an interior surface opposed to the feed tube. A feed tube surface forms a feed tube substrate opposed to the interior surface of the piston, a piston exterior surface forms a piston substrate opposed to the casing. Both the piston exterior surface and the feed tube surface have a surface finish $R_a$ of 0.3µ or finer and further include a multi-layer coating. As used herein, the symbol µ is used interchangeably to mean "micron or micrometer," unless otherwise specified. The multi-layer coating further comprises an intermediate layer overlying and in contact with the substrate and a diamond-like carbon (DLC) coating layer overlying and in contact with the intermediate layer with a thickness determined by the application requirements.

The coating architecture of the present invention includes a substrate having a surface finish ($R_a$) of 0.3µ or finer, which is equivalent to 12 microinches or finer. An intermediate layer overlies the substrate and is applied in a manner that does not affect the hardness or heat treat condition of the substrate. The intermediate layer is applied to a thickness of about 3-5µ. Overlying the intermediate layer is a DLC coating applied in sufficient thickness to completely cover the nanolaminate layer, but not so thick as to lose its characteristics as an adherent, solid coating layer, and specifically as a solid lubricant layer, due to excessive residual stresses.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 10 are micrographs at 200 magnification of a piston coated with a DLC coating in the new condition and after cycling in a test rig.

FIG. 11 are micrographs at 200 magnification of a piston coated with nickel graphite in the new condition and after cycling in a test rig was terminated due to wear.

DETAILED DESCRIPTION OF THE INVENTION

Figure 1:
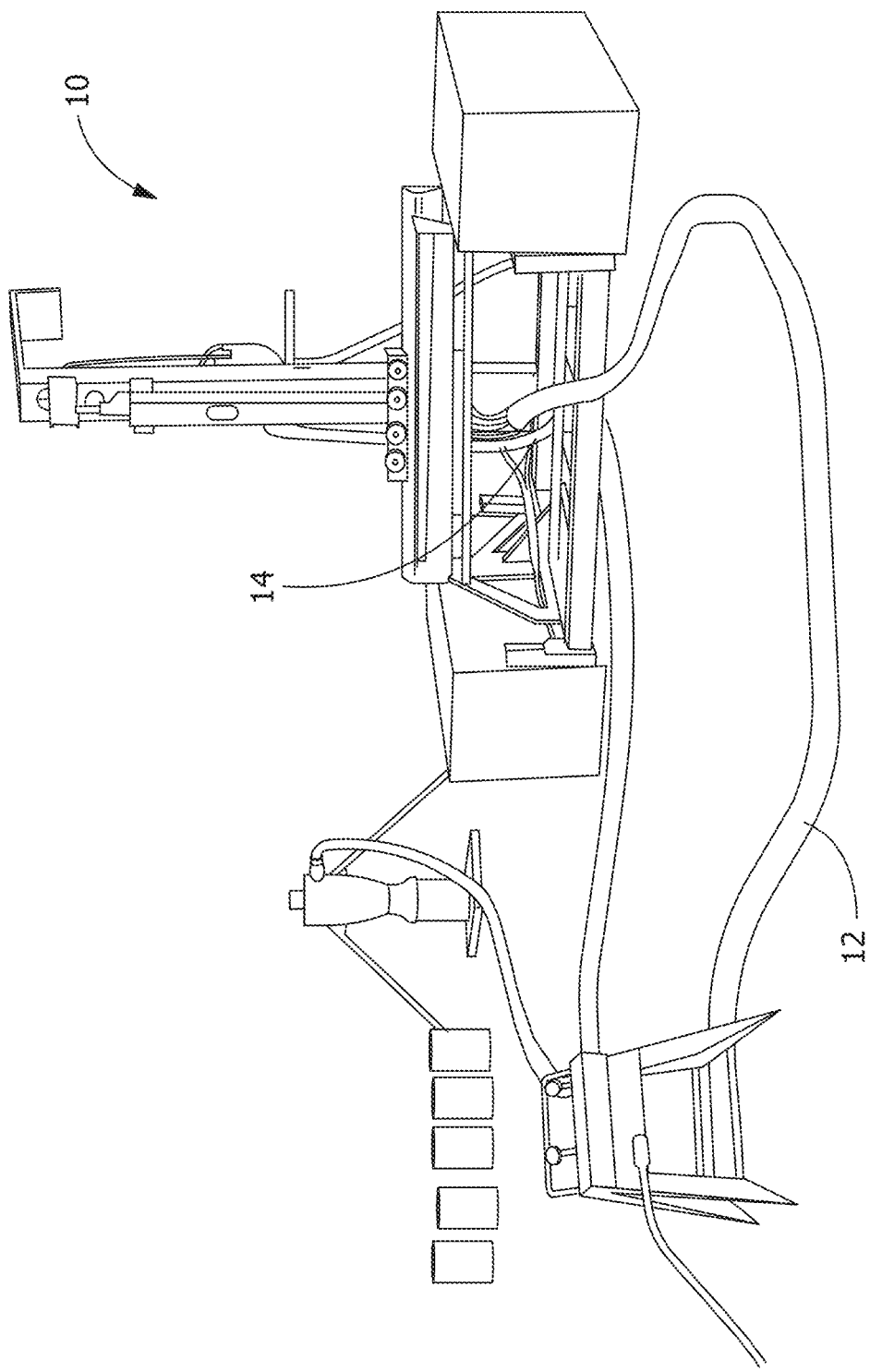
FIG. 1 depicts a test rig that utilizes the hammer drill of the present invention.

The present invention provides a multi-layer solid lubricant architecture for use on a reciprocating surface subject to high friction forces such as a hammer drill. FIG. 1 depicts a test rig 10 for an air driven hammer drill 20 of the present invention. Although test rig 10 was assembled for testing, the test rig is typical of an actual rig set-up. Test rig 10 includes a compressed air hose 12 connected to air hammer 14.

Figure 2:
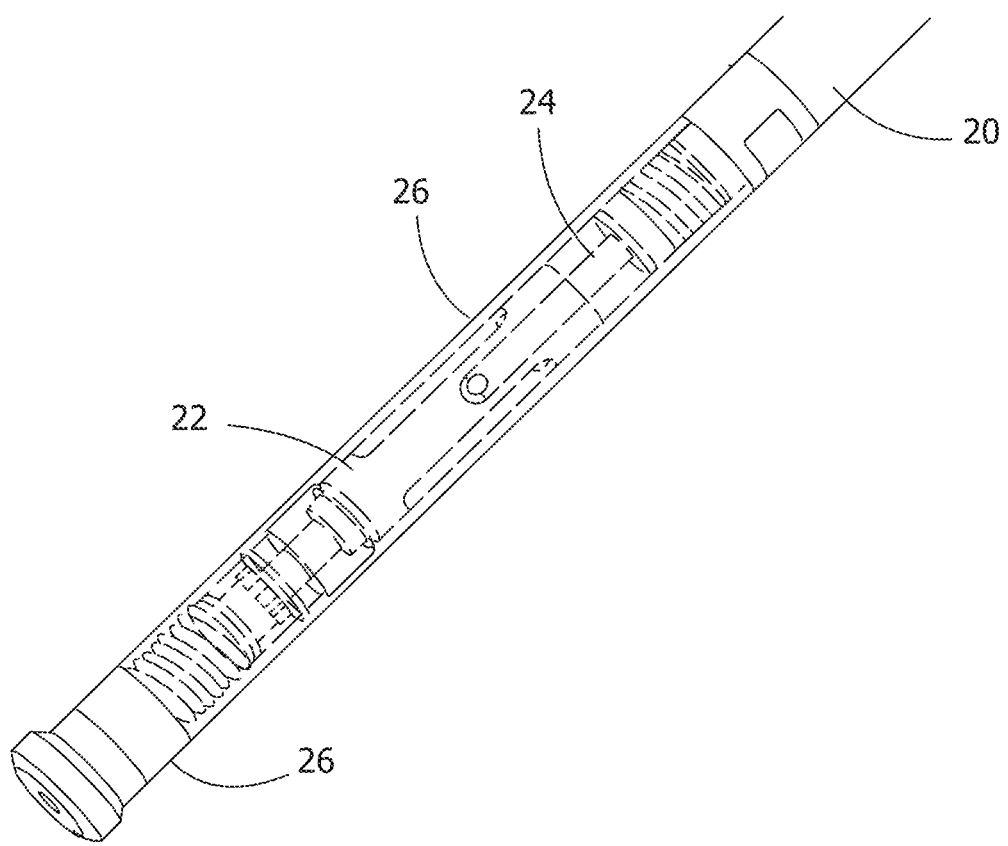
FIG. 2 is a perspective view of a hammer drill.
Figure 3:
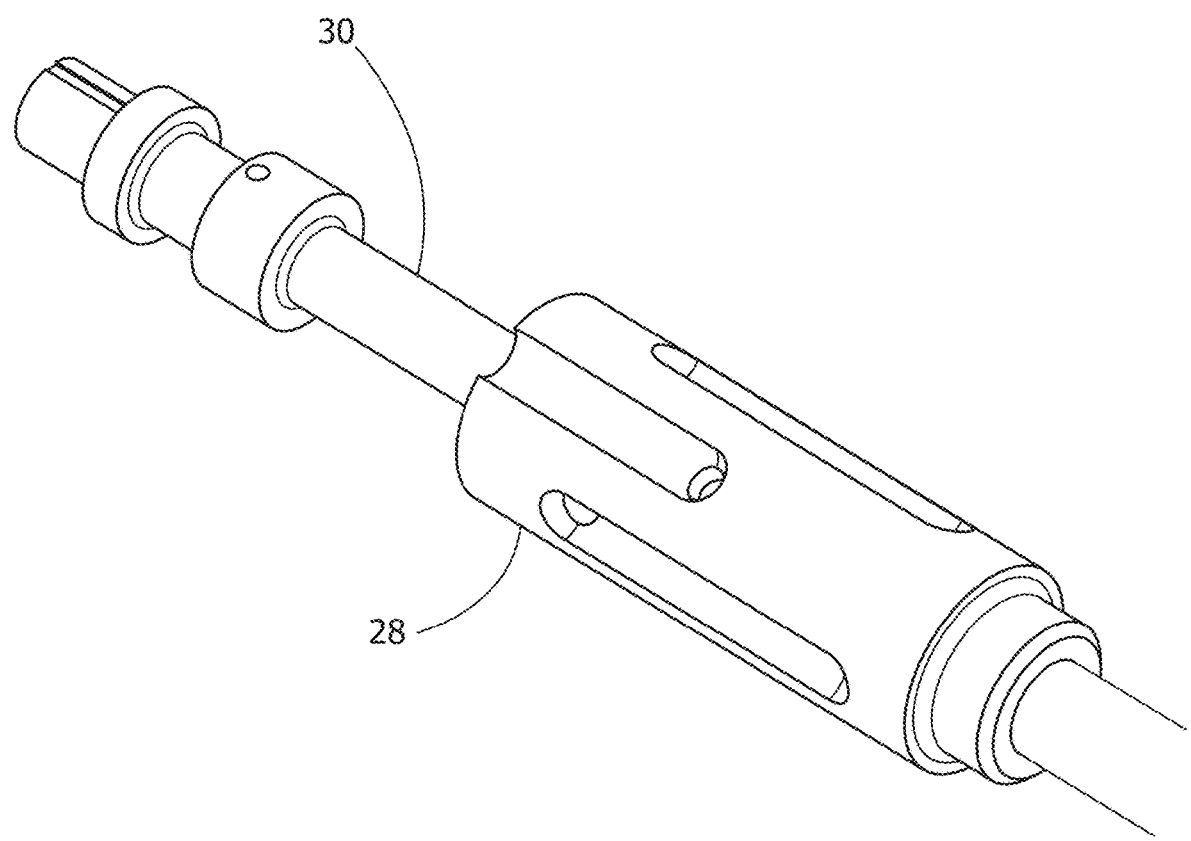
FIG. 3 depicts surfaces of the hammer drill of FIG. 2 coated with the coating of the present invention.

FIG. 2 is a perspective view of a hammer drill 20, which is not visible in FIG. 1 as it is underground, depicting an air driven piston 22 and feed tube 24. Air-driven piston 22 is positioned over feed tube 24 and within casing 26. Piston 22 reciprocates within casing 26 and over feed tube 24, driving hammer drill 20. To reduce friction, the exterior surface 28 of piston 22 and the exterior surface 30 of feed tube are coated with a lubricant, as depicted in FIG. 3. As previously noted, conventional lubricants such as grease or oil may no longer be acceptable alternatives for use with down the hole hammer components under high temperature conditions or environmentally sensitive areas.

Figure 4:
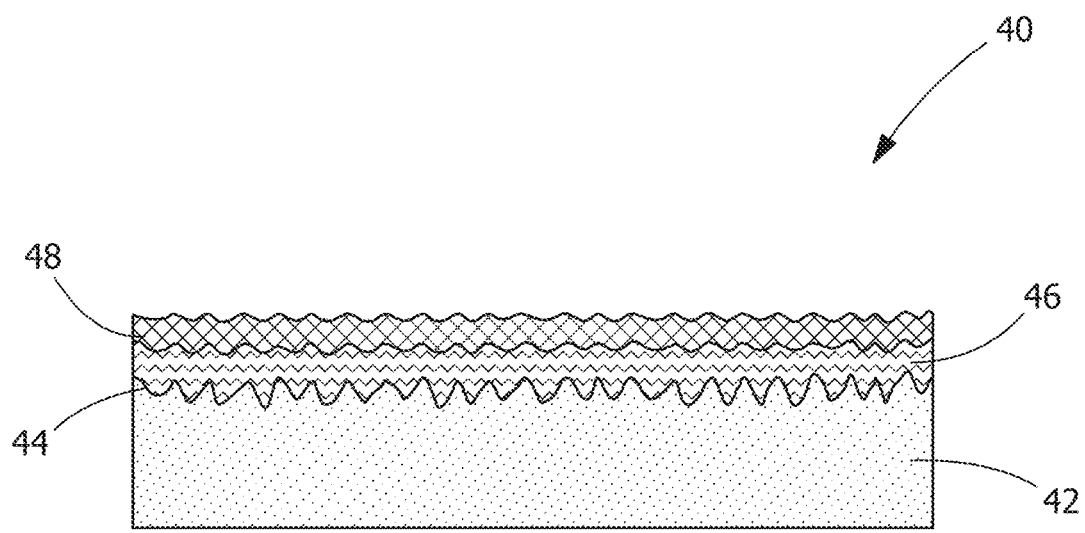
FIG. 4 is a cross-section of the coating architecture of the present invention.

Referring now to FIG. 4, which is a cross section of the solid lubricant coating system 40 of the present invention, a substrate material 42 is provided. The substrate is provided with a surface finish having a roughness ($R_a$) of 0.3 microns or finer, which is 12 microinches or finer. This surface finish was produced by centerless grinding, but any other machining invention that can produce a surface finish meeting this roughness requirement may be utilized. The surface finish is an important aspect of the present invention in obtaining proper adhesion of the coating to the substrate material. While it is well-known that surface roughness can be used to improve adhesion of a coating to a substrate, the surface finish set forth herein prevents poor adhesion of the coating of the present invention to the base material under the conditions of use encountered in drilling operations. A surface finish that is rougher results in flaking and delamination during use as a result of the severe alternating stresses applied to the drill. A surface finish that is smoother results in application of a coating having poor adhesion. A surface finish within the specified range, however, reduces asperity contact stresses between the moving parts, helping to ensure the integrity of the coating.

The substrate material 42 is a steel, and preferably a high strength, high speed tool steel, such as a molybdenum (moly) high speed tool steel or a tungsten high speed tool steel or precipitation hardening stainless steel such as 15-5 or 17-4. Moly high speed tool steels, such as well-known compositions of M2 or M42 that have vanadium and/or cobalt, can withstand high operating temperatures without affecting their hardness (temper condition). Tungsten high speed tool steels, such as T1 through T5 and T8 and T15 that include vanadium and/or cobalt are hardenable with a high hot hardness. Because the microstructures of the tool steels are a tempered martensite, excessive heat can result in a deterioration of the tool steel, so subsequent processing of the substrate material as well as its use desirably should avoid heat treatment conditions that would adversely affect the microstructure and hardness.

An intermediate layer 46 is applied over substrate 42. The intermediate layer serves three primary functions. The first is an adhesion layer. It promotes adhesion between the solid lubricant coating and the substrate. Another purpose of the intermediate layer is to offer a load bearing surface for the solid lubricant coating. It provides tough load bearing support structure for a solid lubricant coating to withstand impact loading conditions that are encountered during drilling. Finally, it acts as a diffusion barrier between the substrate and solid lubricant. At elevated temperatures, material from the substrate diffuses into the solid lubricant. This diffusion can cause delamination and cracking of the solid lubricant, resulting in coating failure. The solid lubricant coating is applied over and in contact with intermediate layer 46. The intermediate layer 46 forms an interface 44 with substrate along the surface finish, providing a structure that assists in preventing plastic deformation of the substrate and maintains the overall integrity of the materials coating system. The reduction in asperity contact stress by these structures assists in prevention of the plastic deformation of the substrate. The intermediate layer forms a buffer between the substrate and the top solid lubricant layer and assists in the prevention of the plastic deformation of the substrate.

While hardness is a desirable characteristic of the intermediate layer 46, it must adhere tightly to substrate 42 and the process for application of intermediate layer 46 to substrate 42 must not have adverse effects on substrate 42. The intermediate layer can be formulated from a simple metallic layer such as silicon (Si) or titanium (Ti), monolithic ceramic layer such as silicon carbide (SiC), titanium carbide (TiC), or titanium nitride (TiN), or a nanolaminate layer such as titanium carbonitride (TiCN) or aluminum titanium nitride (AlTiN). More specifically, application of intermediate layer 46 to substrate 42 should not affect the temper condition nor, importantly the hardness of substrate 42. While the above listed materials are preferable materials for use as intermediate layer 46, other similar nitrides and carbides can also be used. Certain deposition techniques are not compatible with the overall objective of the coating systems. For example, while TiCN is a preferred nanolaminate intermediate layer 46, application of TiCN utilizing a cathodic arc deposition technique requires processing temperatures in the range of 350° C. to 45° ° C. (662° F.-842° F.) which could impact hardness of the base material and cause grain growth. Processing temperatures desirably should be kept below about 250° C. (about 500° F.). Within the temperature range, as the temperature becomes higher, it is desirable to shorten the time to process the system. The nanolaminate is applied to a thickness of 3-5 microns (0.00012-0.00020" or 0.12-0.2 mils). The thickness is carefully controlled to provide adequate coverage without allowing nanolaminate layer 46 to lose its characteristics as a coating.

A solid lubricant is applied over intermediate layer 46. A diamond-like carbon structure (DLC) provides the solid lubrication layer 48. The DLC structure is applied to provide a solid surface overlying nanolaminate layer 46 and in contact with nanolaminate layer 46. The DLC structure is an amorphous layer having short range ordered phases of diamond-like structures. The short range ordered phases may have an $sp^3$-type tetrahedral structure (with associated short range tetrahedral bonding) characteristic of diamond hybridization, or a short range $sp^2$-type trigonal structure (with associated short range trigonal bonding) characteristic of graphitic hybridization, as well as a combination of these short-range ordered phases within solid lubricant layer 48. The DLC materials may be doped with hydrogen, from about 10 atomic percent to about 50 atomic percent, to yield hydrogenated DLC. Alternatively, the DLC may be doped with $N_2$, Si, $SiO_x$ and/or transition metals/transition metal carbides/transition metal nitrides. Preferably, the transition metals are selected from the group consisting of Cr, W and Ti. The doped DLC phases form nanoscale hard phases to improve mechanical strength, hardness and wear resistance.

The DLC coating 48 was applied to the exterior surface 28 of the piston and to the exterior surface of the feed tube 30 using a chemical vapor deposition (CVD) technique. More specifically, DLC coating 48 was applied using a plasma-enhanced chemical vapor deposition (PECVD) technique. The plasma enhanced chemical vapor deposition (PECVD)

is a process in which the constituent of the precursor (typically in the vapor phase) react to form a solid film. In the PECVD technique, the gas molecules are mainly dissociated by electron impact generating neutral, radical, and ion species. Since the gas molecules are activated by the energetic electrons instead of thermal energy as in the Chemical Vapor Deposition (CVD), the reaction temperatures can be easily reduced. Thus, coatings can be deposited at temperatures of less than 200° C., since the activation energy for the chemical reaction is provided by the glow discharge (electrons) on the biased substrate (or part). The ability of PECVD to deposit coatings at much lower temperatures than most conventional Chemical Vapor Deposition (CVD) prevents any potential microstructural changes and mechanical property modifications to the substrate alloys that are used to fabricate the parts. However, the use of low vapor pressure precursors will also allow the application DLCs by CVD techniques. The coating was applied to a thickness of 1-2μ (0.00004-0.00008") by Sultzer Metco, a Swiss Company having coating facilities at Research Triangle Park, North Carolina. However, any other coating may be used provided that the thickness of the applied DLC coating 48 is sufficient to completely coat the underlying nanolaminate layer 44, and not so thick that DLC coating 48 causes a buildup of residual stress during film deposition. Buildup of residual stresses in the film will result in fracture and delamination during operation, specifically on impacts. Preferably, DLC coating 48 may be applied to a thickness of from about 0.3μ to about 5μ (about 0.00001" to 0.00020"). It can be seen that the low end of the allowable thickness for DLC coating 48 corresponds to the surface finish of substrate 42.

The coating system 40 set forth above exhibits an unusual combination of tribological and mechanical properties, including but not limited to low coefficients of friction, low wear rates, relatively high hardness and high elastic modulus. These properties contribute to the low asperity contact stresses between parts in a reciprocating system.

A hammer drill having the innovative coating architecture set forth herein was tested. As noted above, conventional hammer drill operation requires the use of traditional lubricants such as grease or oil, which may be unacceptable in certain situations, while the coating architecture set forth herein utilizes a solid lubricant. The coating architecture set forth herein was tested against systems utilizing no lubricants as well as other lubricant systems. The purpose of the test was to evaluate how hammer components perform under simulated operating conditions with no lubrication and with solid lubricants. The test was conducted on a TEI platform rig using compressed air at pressures of 350 psi and below. The hammers were attached to a fixture that allowed the hammer components to cycle without having to penetrate rock. Three hammers were tested. Two with coatings and one without a coating, serving as a baseline for performance. For the coated hammers, the coatings were applied to the outside surfaces of the piston and feed tube. The run times for each of the test cases are listed in Table 1.

The temperature of the hammer case was measured during operation. Temperature measurements were chosen as a way to estimate the relative effectiveness of the coatings, as increased friction invariably results in higher temperatures, absent a cooling mechanism. Thermocouples were located at three locations along the length of the hammer case.

For each of the test cases, the hammers were run for the duration specified in Table 1. Afterwards, the hammers were disassembled and inspected. The inspection includes a visual inspection of the surface of the piston and feed tube. Wear marks were noted. The change in temperature from the start of the test was also recorded. Wear areas were estimated by overlaying 0.25"×0.25" grids on the piston and feedtube. Wear is defined as a visible variation in the surface when compared to the original surface.

Figure 5:
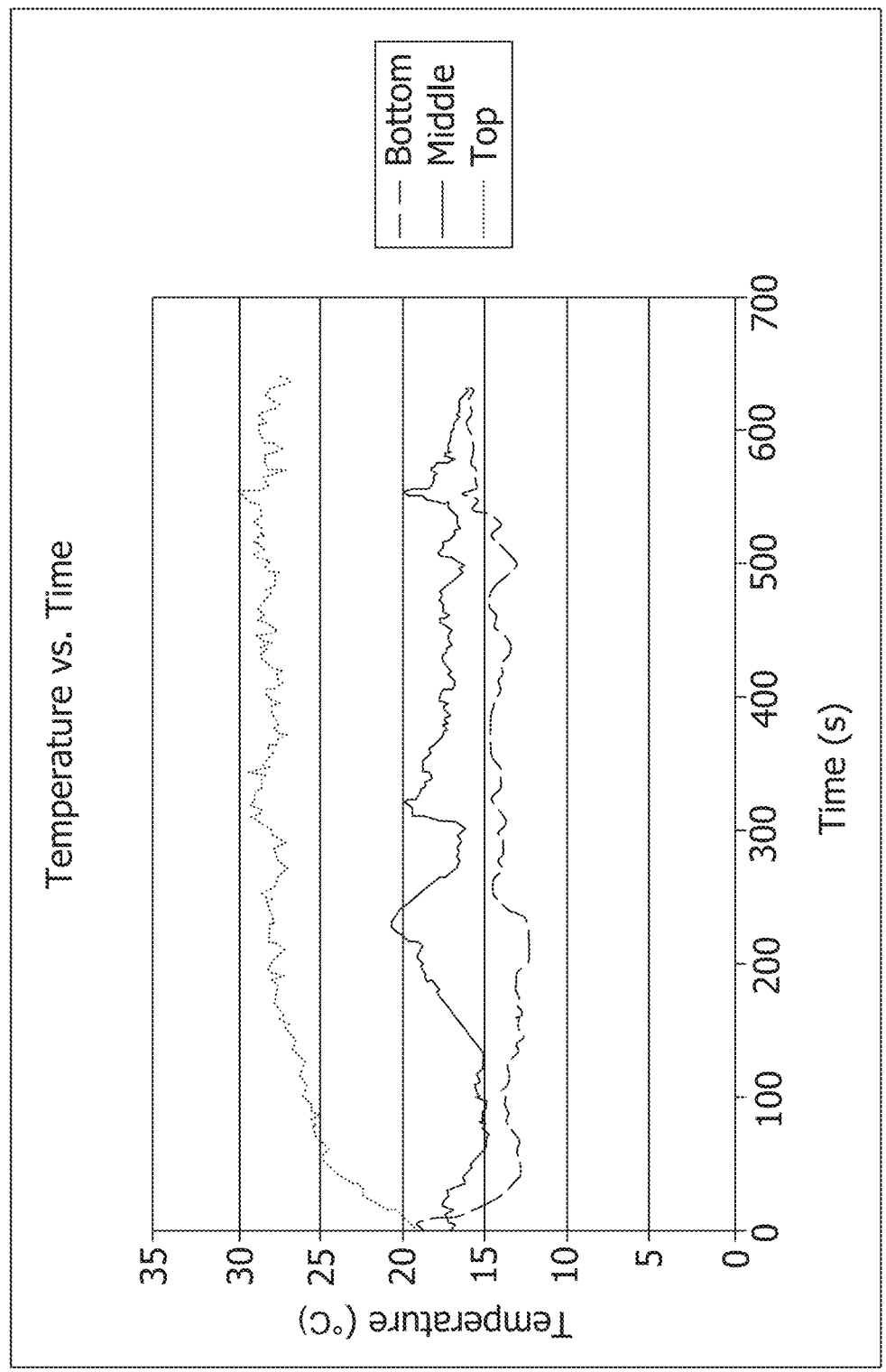
FIG. 5 is graph of temperature versus time providing a temperature profile of a hammer drill measured at three locations along its casing.
Figure 6:
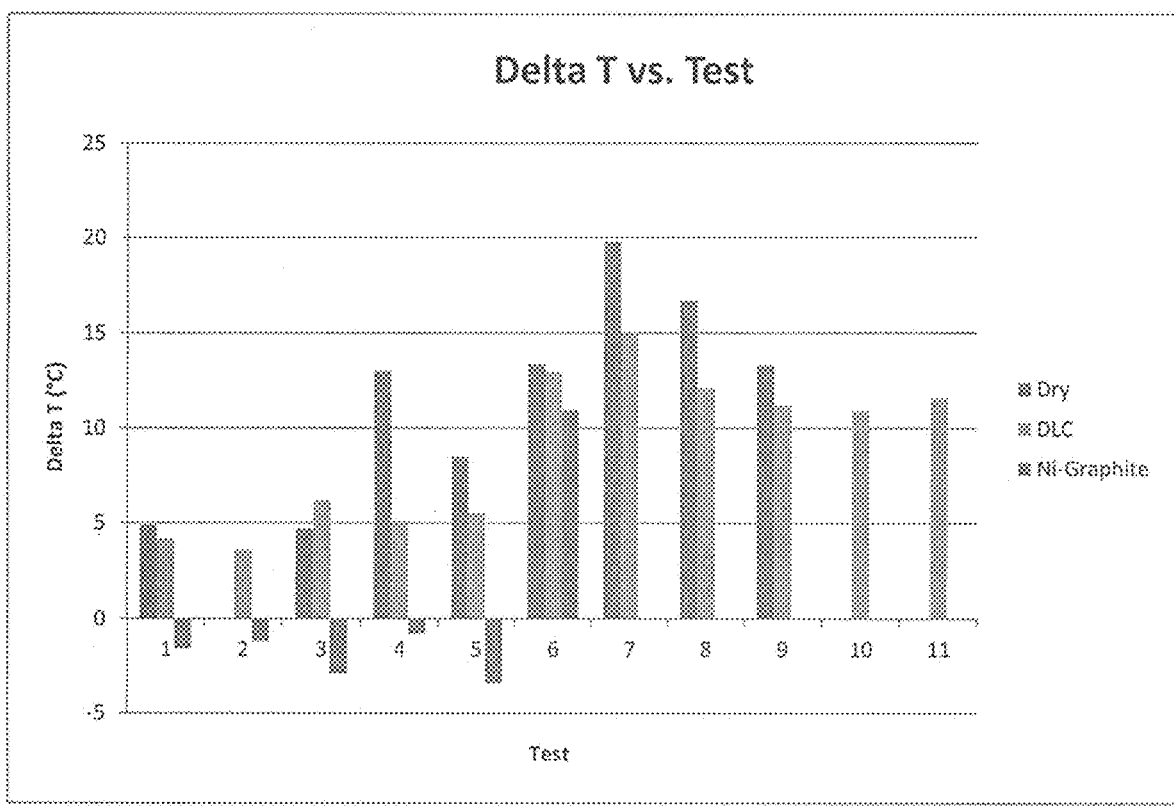
FIG. 6 is a graph depicting the change in temperature, that is, the temperature rise observed in the casings tested, an uncoated casing, a casing coated with a DLC coating and one coated with nickel-graphite.

A typical plot of the thermocouple temperature data is shown in FIG. 5. In the legend of FIG. 5, bottom, middle, and top refer to the thermocouples at different positions along the hammer drill casing 40, respectively. In all the cases, the largest temperature increases were observed at the top of the casing 40. The minimal temperature rise seen by the middle and bottom thermocouples was due to the forced convection from the air driving the drill. In those regions, there was sufficient air flow to prevent any sustained heating. The temperature rise ($\Delta T$) measured during operation is plotted in FIG. 6. $\Delta T$ was determined from subtracting the maximum temperature observed during operation from the starting temperature for each thermocouple. Negative temperatures indicate a drop in temperature from the start of the test. A drop in temperature is believed to be due to the convective cooling in the piston stroke region during operation from compressed air.

In each of the cases, the temperatures measurements for the Ni-graphite coated hammer resulted in the lowest measured $\Delta T$. The average temperature rise over the six tests for the uncoated hammers, DLC coated hammers, and Ni-Graphite coated hammers was 8.9° C., 5.9° C., and 0.0° C. as measured at the respective thermocouples.

Figure 7:
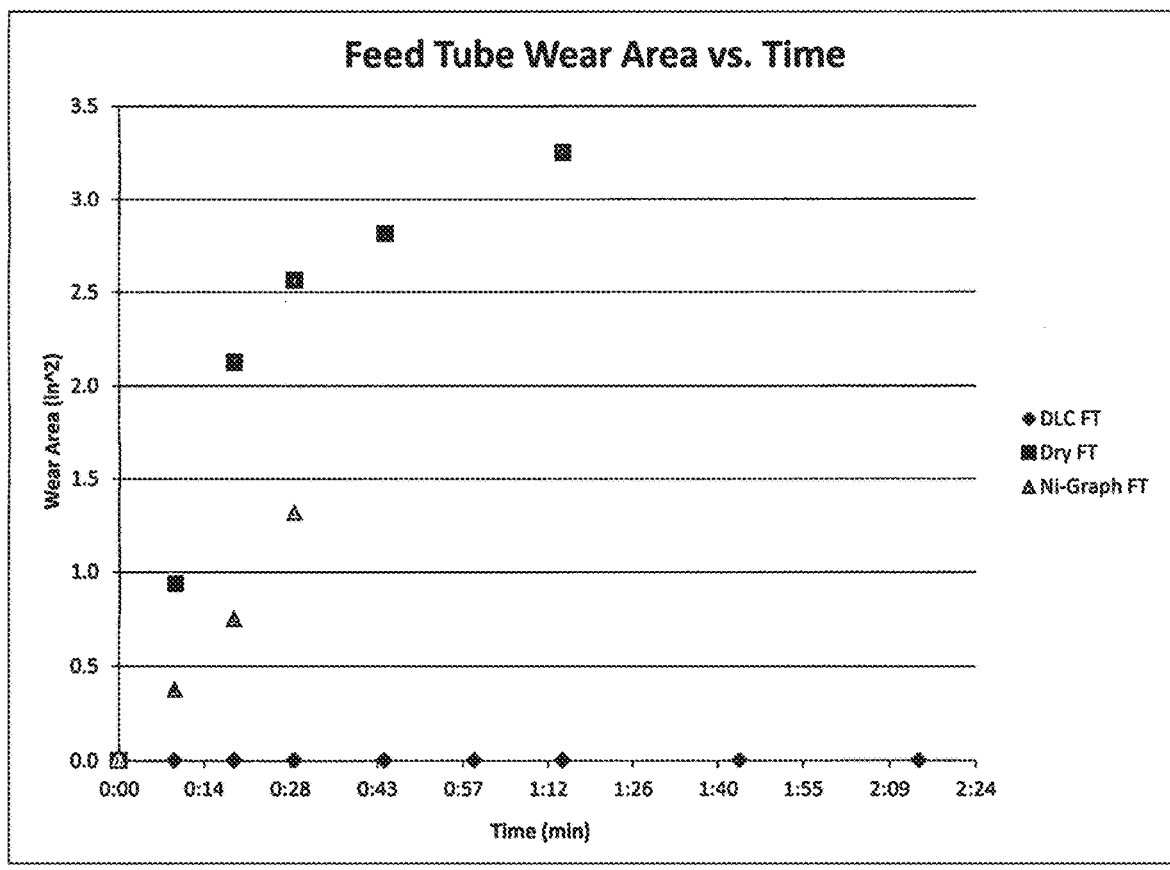
FIG. 7 is a graph depicting measured feed tube wear area over time observed in the drills tested, an uncoated casing, a casing coated with a DLC coating and one coated with nickel-graphite.
Figure 8:
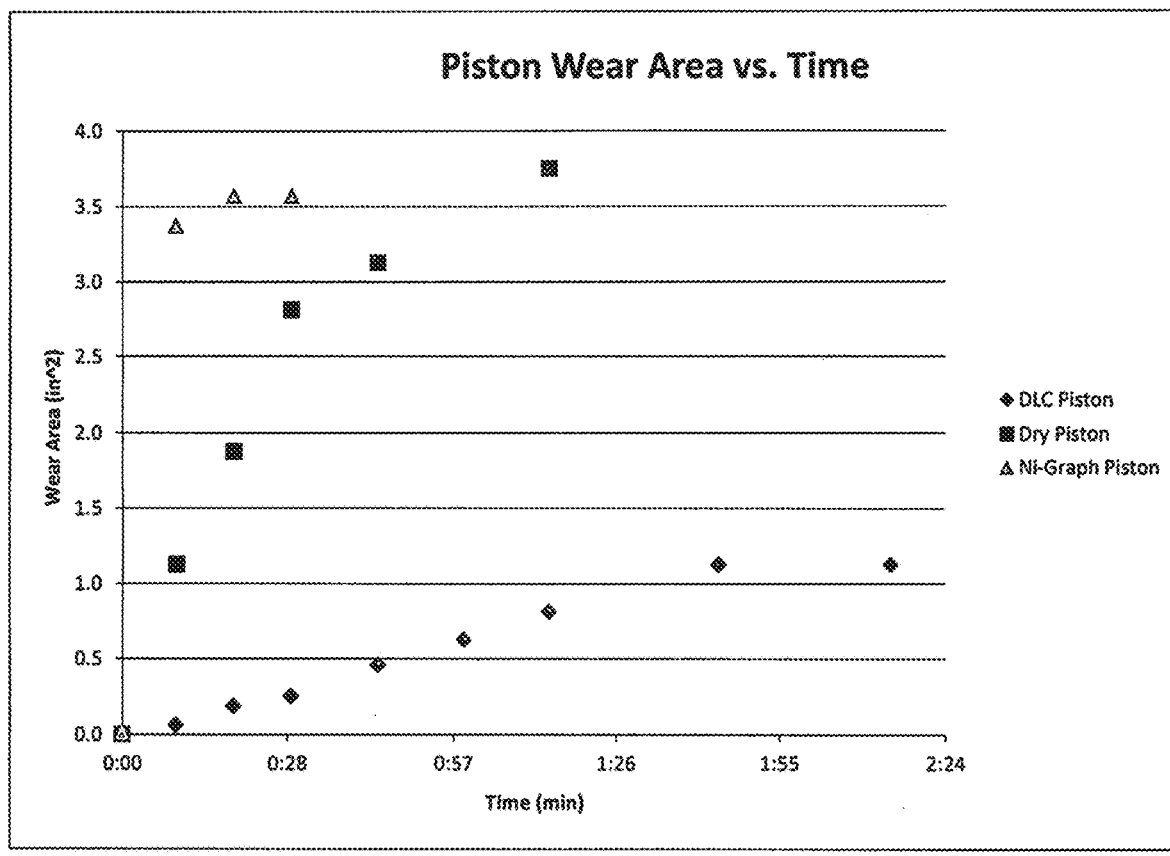
FIG. 8 is a graph depicting measured piston wear area over time observed in the drills tested, an uncoated casing, a casing coated with a DLC coating and one coated with nickel-graphite FIG. 9 are micrographs at 200 magnification of an uncoated piston in the new condition and after cycling in a test rig.

The wear areas for the feed tube and piston are shown in FIG. 7 and FIG. 8, respectively. The wear area rate for the uncoated pistons displayed a sharp increase early in the operation followed by a decrease after approximately 30 minutes of operation. This is consistent with a break-in operation where any high-spots and surface irregularities will create contact wear. After those regions settle, the progression of wear decreases due to the increase in the contact areas as asperities flatten and contact stresses at the asperities decrease.

The DLC-coated feed tube showed no visible signs of wear over nearly 135 minutes of operation. This is encouraging when compared to the visible wear in the uncoated feed tube. The wear rates for the piston followed similar patterns to the wear rates for the feed tubes. The DLC-coated parts exhibited a steady wear pattern, while uncoated parts exhibited a larger early wear rate followed by a decreasing wear rate.

Estimating the wear area of the Ni-Graphite parts was more subjective than the other DLC-coated hammer and the uncoated hammer due to the nature of the Ni-graphite coating. Under the microscope, the worn surface of the Ni-Graphite appears very similar to the new surface. As it wears, the underlying layers which are applied in the same fashion as the upper layers are exposed. The distinction between worn and unworn regions is less clear. As a result,

TABLE 1

| Test | 1 | 2 | 3 | 4 | 5 | 6 | 7 | 8 | 9 |
|---|---|---|---|---|---|---|---|---|---|
| Duration | 30 s | 1 min | 3 min | 5 min | 10 min | 10 min | 15 min | 15 min | 15 min | it is possible that multiple readings for the wear area could result in largely different results. However, the trends appear to be consistent.

After completing the tests, the uncoated piston and feed tube showed strong signs of wear and burnishing, with wear marks evident from contact between the piston and case and piston and feed tube. On the piston, the wear was limited to approximately 2.5" from the impact end. This wear characteristic is present in each of the other pistons tested, regardless of coating, from the reciprocating action.

Wear marks on the feed tube were present from the free end up to approximately 6.0" from the end due to regions of contact between the feed tube and piston. Although the temperature rise measured in the uncoated hammer was relatively low for these tests, operating at elevated temperatures coupled with continued rubbing contact in those regions should ultimately result in material and component failure.

Figure 9:
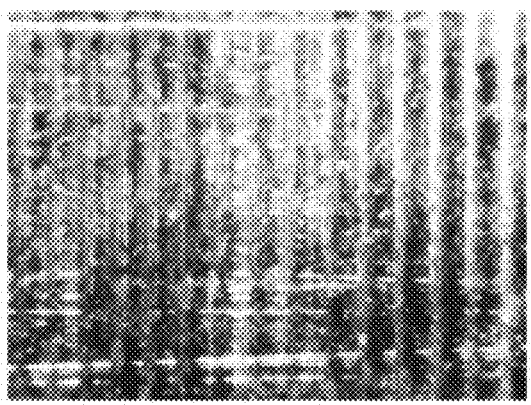
Figure 9:

FIG. 9 is a magnified image of the uncoated piston surface new (left) and after Test 6 (right). In the new image, the machining marks are clearly visible, and they are in a circumferential orientation. The worn piston image shows the machining marks worn completely away. The wear marks are in the longitudinal direction, indicating wear due to the axial motion of the piston.

The DLC-coated piston showed wear characteristics similar to the uncoated piston. Wear was uniform around the piston approximately 2.5" from the striking end. However, the wear marks were not as pronounced after the same duration of operation. There was a controlled progression of the wear area on the piston face. Wear progressed linearly from the beginning of the test to 106 minutes at rate of 0.011 in$^2$/min. From Test 10 to Test 11, there was minimal additional wear on the piston face.

The difference in wear between for the DLC-coated feed tube and the uncoated one was much more significant. After Test 11, there was no visible bare metal on the feed tube. The finish is nearly identical to the original.

The DLC coating 48 wear marks differ from those found on the uncoated piston. The image shown in FIG. 10 (left) is that of a new DLC-coated piston. The underlying surface has been ground with the grinding marks lying circumferentially. The wear marks on FIG. 10 (right) after cycling continue in the circumferential direction, unlike those found in the uncoated hammer after cycling. This would indicate that the DLC coating 48 is providing additional protection against the axial wear from reciprocation compared to the uncoated piston.

The nickel graphite hammers showed similar wear patterns to the other hammers. The new nickel graphite piston and feed tube had a matte, slightly rough finish. After Test 6, the main body of the piston appears to have maintained its surface integrity. The primary wear approximately 2.5" from the striking end was very similar to that seen in the other pistons.

There were visible signs of flaking in the air channels of the nickel graphite hammer. Each of the air channels had a similar pattern on one side of the channel. The application technique was the likely cause of the flaking. During application of the coating, the piston was rotated in one direction. The directional nature of the flaking in the channels corresponded to the directional application method.

The nickel graphite feed tube developed wear patterns similar to the uncoated feed tube. There was a polishing effect on the feed tube within the same area as the uncoated feed tube.

Tests of the Ni-Graphite components were halted after Test 6 due the dimensional changes of the piston. The diameter of the piston was found to be 0.005" under the nominal dimension of the part. Inspection of the microstructure found the porosity of the Ni-Graphite mixture to be approximately 25%. This level of porosity resulted in a weaker structure which in turn caused the lower dimensional stability.

Under the microscope, the worn surface of the Ni-Graphite appears very similar to the new surface as depicted in FIG. 11. This can be attributed to the nature of the coating. Ni-Graphite is applied in layers. As it wears, the underlying layers which are applied in the same fashion as the upper layers are exposed.

The uncoated dry hammer and the DLC-coated hammer both completed the full tests. Each continued to operate for the entire duration without a mechanical failure. The DLC-coated parts were subjected to an additional 60 minutes of testing. The wear patterns for each of the hammers were similar. The wear rate for the DLC coating 48 was near linear throughout the tests. None of the hammers was subjected to large temperature gradients.

Observations from the test show that the hammers were able to successfully operate without lubrication. However, to ensure the integrity of the underlying material, a protective coating should be applied. The results from the test show that the DLC coating 48 performed well in protecting the underlying material under the test conditions (350 psi, ambient temperatures). Wear was observed during the tests, but the progression of wear was controlled and appeared to be minimal.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coating architecture, comprising:
a substrate having a surface finish $R_a$ of 3μ or less;
an intermediate coating overlying and in contact with the substrate; and
a solid lubricant layer overlying and in contact with the intermediate layer,
wherein the solid lubricant layer has sufficient thickness to completely cover the coating architecture,
wherein the solid lubricant layer further comprises a diamond-like carbon (DLC) coating layer;
wherein the DLC coating layer further comprises an amorphous layer having short range ordered phases of diamond-like structures;
wherein the short range ordered phases of diamond-like structures include an sp$^2$-type trigonal structure associated with short range trigonal bonding characterizing graphitic hybridization.

2. The coating architecture of claim wherein 1, the intermediate layer is a nanolaminate, monolithic ceramic or metallic layer.

3. The coating architecture of claim 1, wherein the DLC coating layer is doped with 10-50 atomic percent hydrogen, forming hydrogenated DLC.

4. The coating architecture of claim 1, wherein the DLC coating layer is doped with a material selected from the group consisting of $N_2$, Si, $SiO_x$, a transition metal, a transition metal carbide/nitride and combinations thereof.

5. The coating architecture of claim 1, wherein the DLC coating layer is applied to a thickness sufficient to completely coat the intermediate layer.

6. The coating architecture of claim 1, wherein the DLC coating layer is applied to a thickness that does not result in residual stress in the DLC coating layer during application.

7. The coating architecture of claim 1, wherein the DLC coating layer is applied to a thickness of 1-2 microns.

\* \* \* \* \*